United States Patent
Yochum (10) Patent No.: US 9,836,064 B2
(45) Date of Patent: Dec. 5, 2017

(54) AIRCRAFT LANDING SYSTEMS AND METHODS

(71) Applicant: The Boeing Company, Chicago, IL (US)

(72) Inventor: Thomas E. Yochum, Bothell, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/059,173

(22) Filed: Mar. 2, 2016

(65) Prior Publication Data

US 2017/0255204 A1   Sep. 7, 2017

(51) Int. Cl.
| | |
|---|---|
| *G06F 19/00* | (2011.01) |
| *G05D 1/06* | (2006.01) |
| *G05D 1/04* | (2006.01) |
| *G01S 13/95* | (2006.01) |
| *G01S 13/91* | (2006.01) |
| *H01Q 15/18* | (2006.01) |

(52) U.S. Cl.
CPC .......... *G05D 1/0676* (2013.01); *G01S 13/913* (2013.01); *G01S 13/953* (2013.01); *G05D 1/042* (2013.01); *H01Q 15/18* (2013.01)

(58) Field of Classification Search
CPC .... G05D 1/0676; G05D 1/042; G01S 13/913; G01S 13/953; G01S 13/75; G01S 13/876; H01Q 15/18; H01Q 1/28
USPC ............... 701/3, 4, 10, 13, 14, 17; 244/75 R
See application file for complete search history.

(56) References Cited

U.S. PATENT DOCUMENTS

| | | | |
|---|---|---|---|
| 2,939,652 A | * | 6/1960 | Hobley ..................... G01S 1/02 244/183 |
| 3,174,146 A | | 3/1965 | Bossier et al. |
| 3,243,816 A | | 3/1966 | Chisholm |
| 3,716,855 A | | 2/1973 | Asam |

(Continued)

FOREIGN PATENT DOCUMENTS

| | | |
|---|---|---|
| EP | 1 860 456 A1 | 11/2007 |
| WO | WO 90/04795 | 5/1990 |

OTHER PUBLICATIONS

Loss et al., "Autonomous Precision Approach and Landing System APALS," Proceedings of the National Telesystems Conference, May 26, 1994, pp. 195-198, IEEE, New York/USA.

*Primary Examiner* — Gertrude Arthur Jeanglaude (74) *Attorney, Agent, or Firm* — Haynes and Boone, LLP (57) ABSTRACT

A method for controlling an aircraft includes storing data aboard the aircraft. The data include the relative positions of radar targets disposed within a region adjacent to the runway. The region is scanned with a radar aboard the aircraft to obtain data corresponding to the relative positions of radar reflections from the region, including reflections from the radar targets. The data corresponding to the radar targets is distinguished from the data corresponding to the radar reflections from the region using correlation techniques. The position and attitude of the aircraft relative to the runway is then assessed using the stored data and the data corresponding to the radar targets. The position and attitude of the aircraft relative to the runway is also evaluated using an independent navigation system. The difference between the assessed position and attitude and the evaluated position and attitude is then used to control the aircraft.

20 Claims, 6 Drawing Sheets

(56) References Cited

U.S. PATENT DOCUMENTS

| | | | |
|---|---|---|---|
| 3,739,385 A * | 6/1973 | Bechtel | G01S 1/02 343/705 |
| 3,765,019 A | 10/1973 | Kosowsky | |
| 4,104,634 A | 8/1978 | Gillard et al. | |
| 4,333,081 A | 6/1982 | Höfgen | |
| 4,675,678 A | 6/1987 | Klingenschmitt et al. | |
| 5,208,601 A | 5/1993 | Hart | |
| 5,483,241 A | 1/1996 | Waineo et al. | |
| 5,654,890 A * | 8/1997 | Nicosia | G01C 21/165 342/118 |
| 5,907,568 A | 5/1999 | Reitan, Jr. | |
| 6,018,698 A | 1/2000 | Nicosia et al. | |
| 6,219,594 B1 | 4/2001 | Nicosia et al. | |
| 6,347,264 B2 | 2/2002 | Nicosia et al. | |
| 6,512,976 B1 | 1/2003 | Sabatino et al. | |
| 6,591,171 B1 | 7/2003 | Ammar et al. | |
| 7,089,092 B1 | 8/2006 | Wood et al. | |
| 7,693,617 B2 | 4/2010 | Dockter et al. | |
| 8,160,758 B2 | 4/2012 | Call et al. | |
| 8,615,337 B1 | 12/2013 | McCusker et al. | |
| 2009/0201190 A1 * | 8/2009 | Huthoefer | G01S 7/003 342/27 |

* cited by examiner

AIRCRAFT LANDING SYSTEMS AND METHODS

BACKGROUND

1. Technical Field

This disclosure relates to aircraft radionavigation systems in general, and in particular, to radar augmented landing systems for aircraft.

2. Related Art

The only aircraft all-weather precision landing system currently in use is the well-known Instrument Landing System (ILS), but with the possibility that a Ground Based Augmentation System (GBAS) Landing System, or "GLS," will be forthcoming in a few years. However, both of these systems are relatively expensive to install and maintain, and in some runway locations, practically difficult to implement.

To make an ILS approach to a runway in bad weather, the weather must be at or above certain specified minimum conditions, depending on the "category" of the ILS system in effect at that runway, i.e., CAT I, CAT II, or CAT IIIa, IIIb or IIIc. If the weather is below the categorization of the ILS, the pilot must revert to a holding pattern, in the hope that the weather will improve to that of the CAT level of the ILS to permit a landing, or divert to another airport to land. Landings may not be made at airports where the environment is below the ILS categorization level.

Systems used by aircraft to make landing approaches can be categorized as either "autonomous" (i.e., systems that rely only on equipment disposed aboard the aircraft, such as an Inertial Navigation System (INS)) and "other-dependent" (i.e., systems that rely on equipment disposed both aboard the aircraft and elsewhere, for example, at the runway, such as an ILS, and/or at another location, e.g., orbiting satellites of the Global Positioning System (GPS)).

In general, there is a need in the industry for systems and methods that can assist in approaching and landing on a runway with such accuracy and integrity that the operation can be considered equivalent to an appropriate ILS "category", using only equipment on board the aircraft. This would enable the provision of all-weather landing guidance at almost any location (i.e., with no terrain limitations), and at minimal investment in equipment and maintenance costs to airport operators.

SUMMARY

In accordance with the present disclosure, one or more embodiments of systems and methods are provided that, for example, may supply the required accuracy and integrity required to provide all-weather landing guidance using only equipment on the aircraft, and thereby enable all-weather landing guidance at any location (i.e., without terrain limitations) and at minimal expense to airport operators.

In one example embodiment, a method for controlling an aircraft comprises storing data aboard the aircraft. The stored data include respective positions, relative to each other and to a runway, of a plurality of radar targets, such as passive radar reflectors, disposed within a region adjacent to the runway, and a desired attitude of the aircraft relative to the runway. The region is then scanned with a radar disposed aboard the aircraft to obtain data corresponding to respective positions, relative to each other and to the aircraft, of a plurality of radar reflections from the region, including reflections from the radar targets. The radar data corresponding to the radar targets are then distinguished from the radar data corresponding to the radar reflections from the region using a correlation algorithm, and a position and an attitude of the aircraft relative to the runway is then assessed using the stored data and the data corresponding to the radar targets. The position and attitude of the aircraft relative to the runway is then assessed using a navigation system that is independent of the radar, such as an INS, and differences are then computed between the assessed and evaluated positions, and the assessed and the evaluated attitudes, respectively. The differences can then be used to correct errors in the assessed position and attitude of the aircraft.

In another example embodiment, a system for controlling an aircraft comprises a database disposed aboard the aircraft that stores data corresponding to respective positions, relative to each other and to a runway, of a plurality of radar targets disposed within a region adjacent to the runway, and a desired attitude of the aircraft relative to the runway. A radar is disposed aboard the aircraft and configured to scan, detect and generate data corresponding to respective positions, relative to each other and to the aircraft, of a plurality of radar reflections from the region, including reflections from the radar targets. A correlator is disposed aboard the aircraft and configured to distinguish the data corresponding to the radar targets from the data corresponding to the radar reflections. A navigation system is disposed aboard the aircraft and configured to evaluate a position and an attitude of the aircraft relative to the runway independently of the radar and using at least one of a global positioning system (GPS), an inertial navigation system (INS), a distance measuring equipment (DME) system, a very high frequency omnidirectional radio range (VOR) system, and/or an instrument landing system (ILS). The navigation system is further configured to assess the position and the attitude of the aircraft relative to the runway using the stored data and the radar data corresponding to the radar targets, compute a position difference between the assessed and evaluated positions, compute an attitude difference between the assessed and evaluated attitudes, and to control the aircraft in accordance with at least one of the position and attitude differences.

In yet another example embodiment, an apparatus for controlling an aircraft includes a radar disposed aboard the aircraft and configured to scan a region surrounding a runway and generate radar data corresponding to respective positions, relative to each other and to the aircraft, of a plurality of radar reflections from the region. A correlator is disposed aboard the aircraft and configured to correlate the radar data with data stored aboard the aircraft. The stored data comprises respective positions, relative to each other and to the runway, of a plurality of radar targets disposed within the region, and a desired attitude of the aircraft relative to the runway, and to distinguish the radar data corresponding to the radar targets from the radar data corresponding to the radar reflections from the region. A navigation system is disposed aboard the aircraft and configured to evaluate a position and an attitude of the aircraft relative to the runway independently of the radar. A computer is disposed aboard the aircraft and configured to assess the position and the attitude of the aircraft relative to the runway using the radar data corresponding to the radar targets and the stored aircraft attitude data, and to compute a difference between the evaluated position and attitude, and the assessed position and attitude. As above, the difference can be used to facilitate an approach to and landing on the runway by the aircraft, e.g., by correcting potential errors in the position and attitude of the aircraft as evaluated by the conventional navigation system.

The scope of this invention is defined by the appended claims, which are incorporated here by reference. A better understanding of the novel systems and methods of the present disclosure, as well as an appreciation of the above and additional advantages thereof, will be afforded to those of some skill in the art by a consideration of the following detailed description of one or more example embodiments thereof. In this description, reference is made to the various views of the appended sheets of drawings, briefly described below, within which like reference numerals are used to identify like ones of the elements illustrated therein.

DETAILED DESCRIPTION

The only existing all-weather landing system currently in use is ILS Category III (i.e., CAT IIIa, IIIb or IIIc). It is expected that GLS will be expanded to include CAT III operations at some point in the future. However, both ILS and GLS are limited in the locations in which they can be installed due to terrain factors that impact the propagation of the guidance signals. In addition, CAT III requires relatively expensive monitoring and periodic calibration work, making its implementation and maintenance relatively exorbitant for, e.g., developing nations. Thus, even assuming that GLS is eventually approved for CAT III operations, its implementation will still be limited due to the cost of the ground infrastructure that must be installed and maintained at each airport.

One or more embodiments of the present disclosure may, for example, supply the requisite accuracy and integrity required to facilitate all-weather landing guidance using only equipment disposed on board the aircraft, and thereby provide all-weather landing guidance at almost any runway location and at a relatively minimal expense to airport operators.

Figure 1:
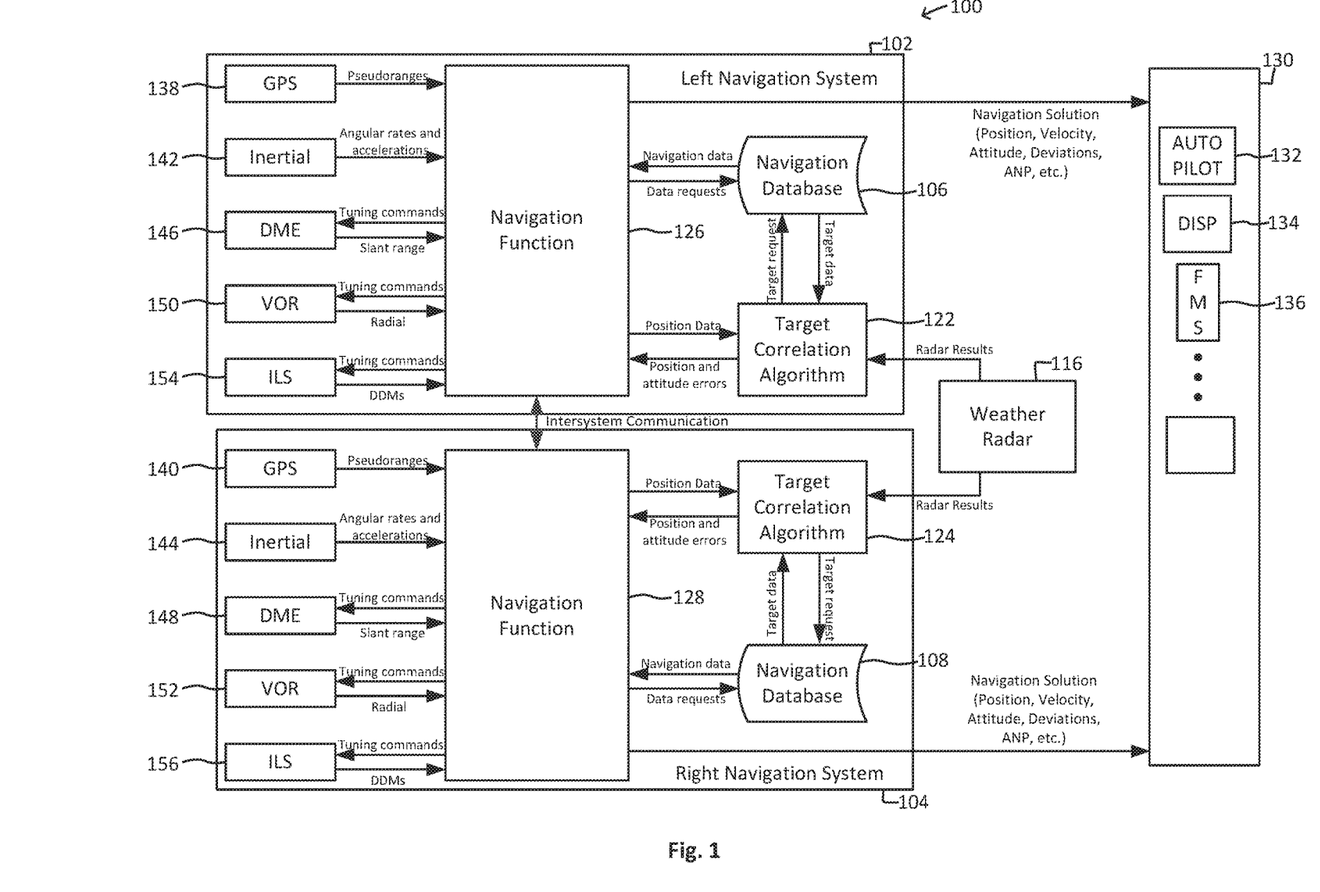
FIG. 1 is functional block diagram of an example embodiment of a system for controlling an aircraft to facilitate an all-weather, precision approach to and landing on a runway in accordance with the present invention.

FIG. 1 is functional block diagram of an example embodiment of a system 100 for controlling an aircraft 110 so as to facilitate an all-weather, precision approach to and landing on a runway 112 in accordance with the present disclosure. In the example embodiment of FIG. 1, the control system 100 comprises a pair of substantially identical navigation systems, viz., a "left" navigation system 102 and a "right" navigation system 104, which operate redundantly, i.e., in parallel with each other, for purposes of reliability and safety. Each of the redundant navigation systems 102 and 104 comprises a navigation database 106 or 108 that stores data essential to the navigation of the aircraft 110, including the relative position and attitude data described below in connection with FIGS. 2-5.

Figure 2:
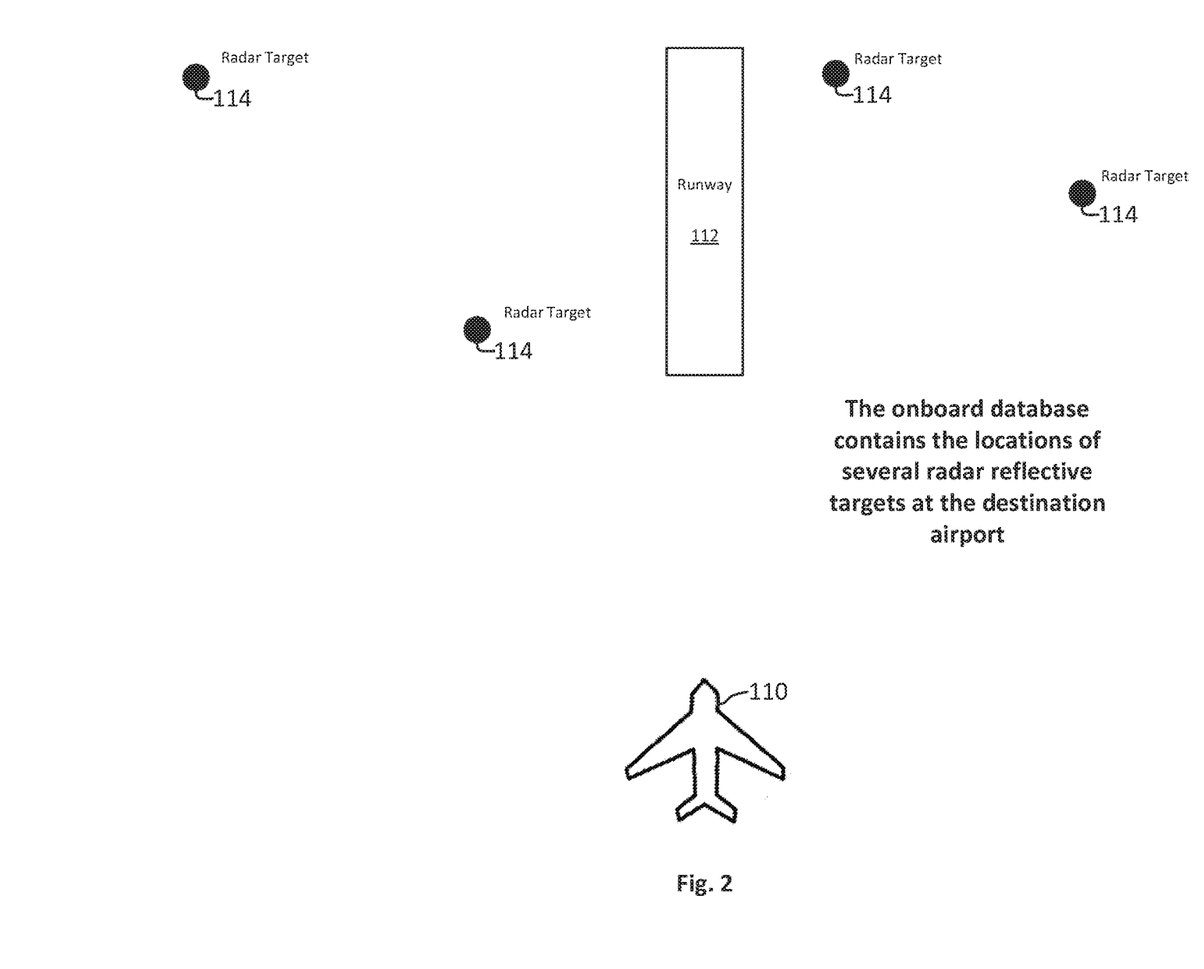
FIG. 2 is a plan view of an aircraft approaching a runway that has a plurality of radar targets disposed within a region adjacent to the runway in accordance with an example embodiment of the present invention.

FIG. 2 is a plan view of an aircraft 110 approaching a runway 112 that has a plurality of radar targets 114 disposed within a region located adjacent to the runway 112. In accordance with the present invention, the radar targets 114 can comprise either "man-made" targets, e.g., buildings, water, radio or TV towers, dihedral or trihedral radar "retroreflectors" of known types, or alternatively, "natural" targets, e.g., hills, valleys, lakes, quarries, or the like. As contemplated herein, the radar targets 114 preferably comprise radar retroreflectors because they are fixed, relatively simple and inexpensive to make, install and maintain, and because they provide relatively reliable radar signal returns or reflections at known, relatively high and consistent signal levels, when compared with those of the other man-made or the natural reflectors.

As discussed in more detail below, it is desirable to obtain and store in the databases 106 and 108 of the aircraft 110 certain dimensional data pertaining to the aircraft 110, the runway 112, and the radar targets 114. In particular, that data correspond to the respective positions, relative to each other and to the runway 112, of the radar targets 114, and a desired attitude of the aircraft 110 relative to the runway 112. The target 114 and runway 112 data can be obtained, for example, by surveying the radar targets 114 and runway 112 using conventional engineering surveying techniques, and the desired attitude of the aircraft 110 relative to the runway, e.g., at touchdown, can typically be specified.

As illustrated FIG. 1, the example control system 100 further comprises a radar 116, e.g., a weather radar of a type commonly disposed aboard a modern commercial jet aircraft. As discussed below, the radar 116, in addition to supplying conventional aircraft weather and collision avoidance functions, can also function as an important adjunct to the navigation systems 102 and 104 in providing all-weather runway approach and landing guidance at almost any runway.

Figure 3:
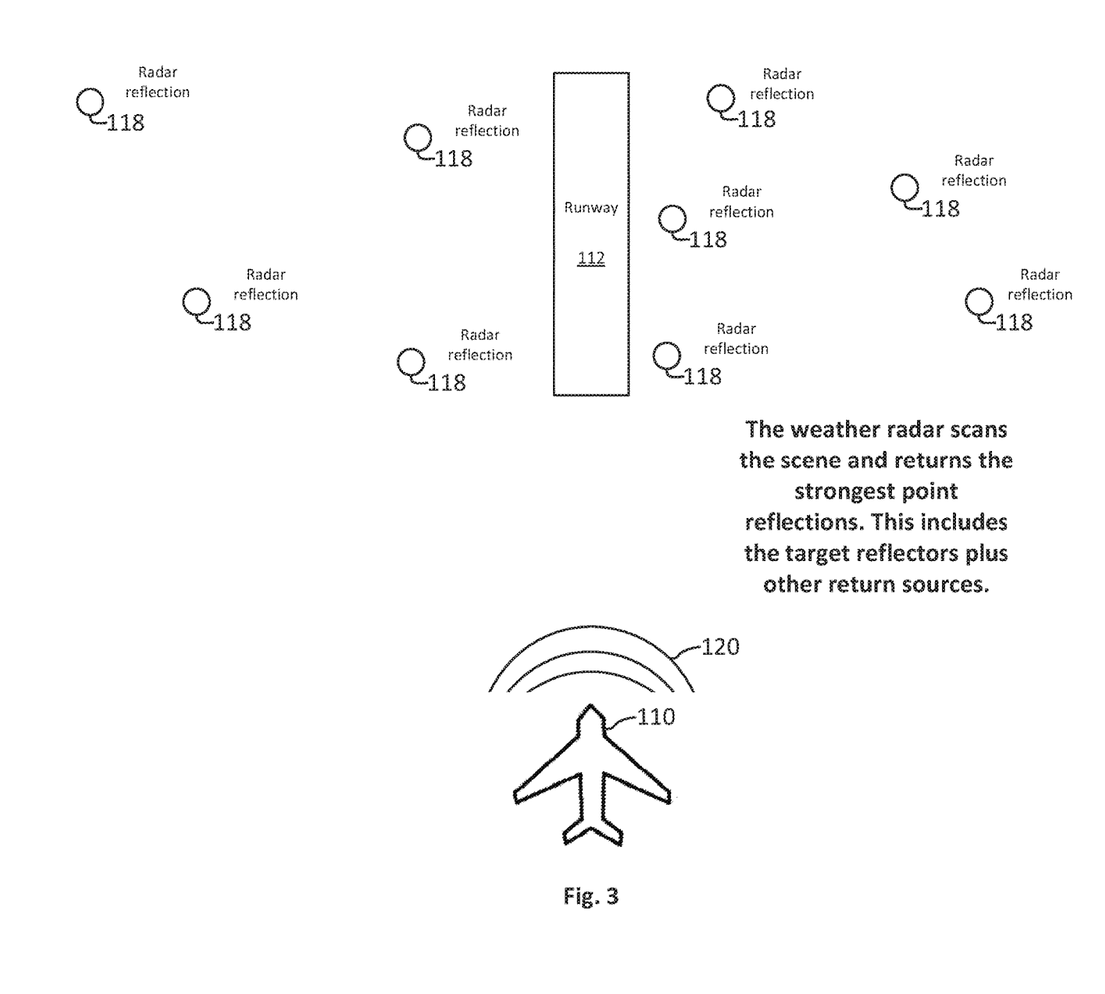
FIG. 3 is a plan view of the aircraft and region of FIG. 2, showing a plurality of radar reflections from the region as a result of the region being scanned by a radar disposed aboard the aircraft.

Thus, as illustrated in FIG. 3, the radar 116 can be configured to scan, detect and generate data corresponding to respective positions, relative to each other and to the aircraft 110, of a plurality of radar returns or reflections 118 from the region adjacent to the runway 110, including reflections from the radar targets 114. As can be seen from a comparison of FIGS. 2 and 3, the radar reflections 118 of the radar beam 120 returning from the region scanned by the radar 116 can, and typically do, include other radar reflections 118 as a result of ground clutter and other radar reflecting surfaces of objects located within the scanned region, which can lead to a reliance on incorrect position and attitude data from the radar returns 118. Accordingly, before the reflections 118 from the radar targets 114 can be used to control the aircraft 110 accurately and reliably, it is first necessary to distinguish the radar data corresponding to the actual radar targets 114 from the spurious radar data corresponding to the other reflecting objects.

As illustrated in FIG. 1, this distinguishing function can be effected by a pair of correlators 122 and 124 respectively disposed in each of the navigation systems 102 and 104 of the aircraft 100. In one advantageous embodiment, each of the correlators 122 and 124 can comprise a computer running software comprising a target correlation algorithm that correlates the respective positions of the radar reflections 118 relative to each other, as obtained by the radar 116, with the respective positions of the radar targets 114 relative to each other, as previously stored in the databases 106 and 108 of the aircraft 110. There are a number of target correlation algorithms that can be used to distinguish the data corresponding to the radar targets 114 from among the data corresponding to the radar reflections 118.

For example, a high correlation coefficient between the respective positions of the scanned radar targets 114 and the stored radar targets 114 can indicate that the radar data corresponding to the former are correct, whereas, a small or even negative correlation coefficient can indicate that the radar data correspond to other objects, rather than the true targets 114. Since the relationship between the respective positions of the targets 114 is linear, the correlation coefficients derived by the correlation algorithm of the correlators 122 and 124 could comprise, for example, the well-known "Pearson" correlation coefficient.

Figure 4:
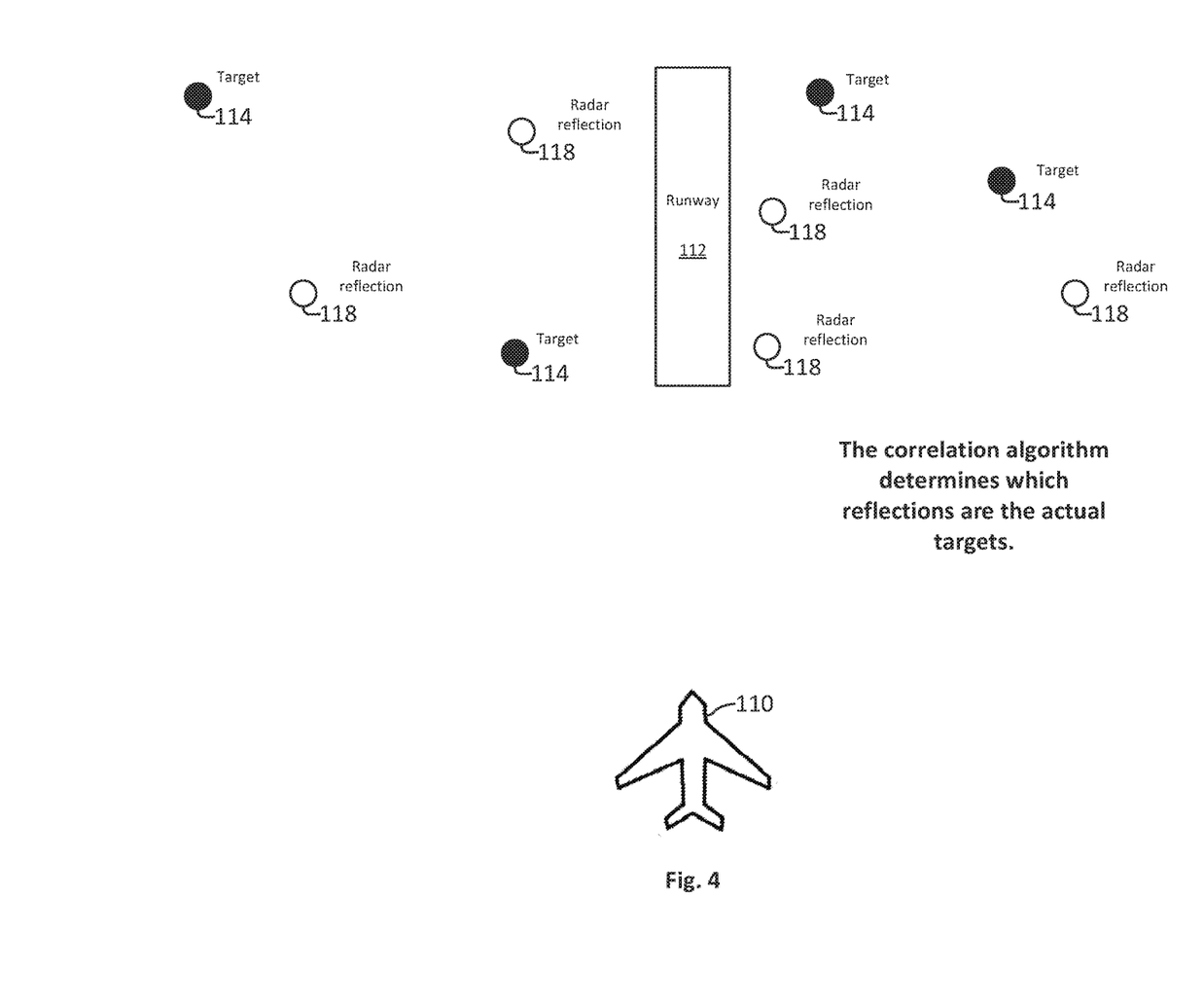
FIG. 4 is a plan view of the aircraft and region of FIG. 3, showing the radar reflections corresponding to the radar targets being distinguished from the other radar reflections returning from the region.

FIG. 4 is a plan view of the aircraft 110 and region of FIG. 3, showing the radar reflections 118 corresponding to the radar targets 114 being distinguished from the other radar reflections 118 returning from the region using the target correlation algorithm.

Figure 5:
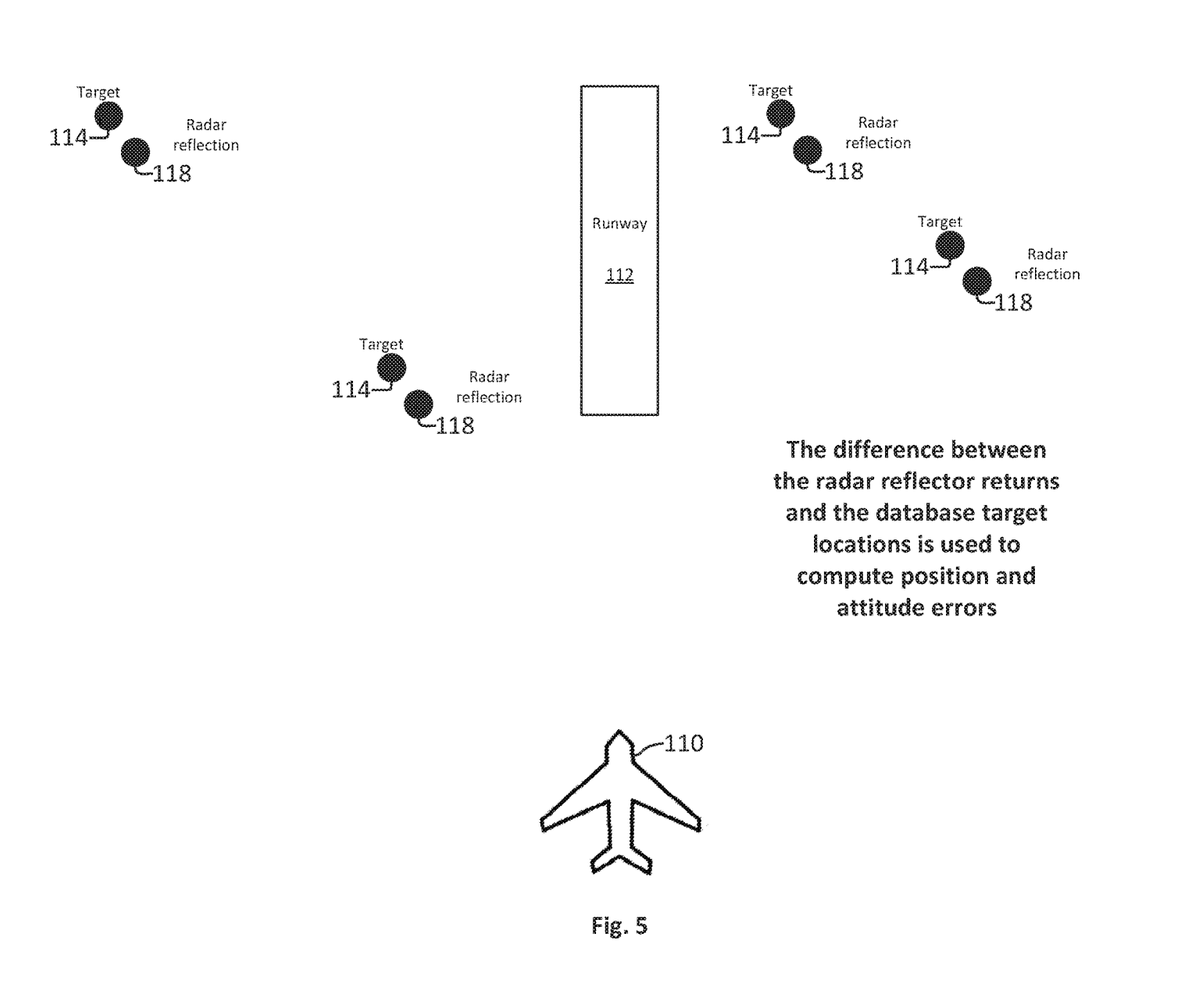
FIG. 5 is a plan view of the aircraft and region of FIG. 4, showing differences between the respective position and attitude of the radar targets, as stored in a database aboard the aircraft, and as distinguished by the radar, respectively, being used to compute aircraft position and attitude errors.

As illustrated in FIG. 5, once the position and attitude of the actual radar targets 114 relative to the radar 116 has been determined, any differences or errors in the position and attitude of the aircraft 110 relative to the targets 114, and hence, to the runway 110, can be assessed mathematically from the radar return target data and the stored target data using well-known arithmetic and trigonometric transformations. As illustrated in FIG. 1, for this purpose, each of the navigation systems 102 and 104 of the aircraft 110 can be provided with a navigation function computer 126 or 128. The "difference" or "error" data computed can be used to control the aircraft 110 to effect an all-weather, precision approach to and landing on the runway 112 in cooperation with a conventional navigation, approach and landing system, as discussed in more detail below.

For example, as illustrated in FIG. 1, the control system 100 can include a group of external systems 130, including an autopilot 132, one or more displays 134, a Flight Management System (FMS) 136, and the like. Thus, in one embodiment, the autopilot 132 can be configured to control the aircraft 110 in accordance with the computed difference or error data. As contemplated herein, "control" means adjusting both the rectilinear movement of the center of gravity (CG) of the aircraft 110, and the angular movement of the aircraft about each of the pitch, yaw and roll axes of the aircraft 110.

In another embodiment, the display 134, which can comprise a so-called "heads up display" (HUD), can be configured to generate and present to a pilot of the aircraft 110 a visual presentation of the difference or error data, including an artificial representation of the runway 112, as illustrated in FIG. 5, and the control of the aircraft 110 can be effected manually by the pilot using the display 134.

As discussed above, modern commercial aircraft 110 are typically equipped with a variety of conventional systems used for navigation, runway approach, and/or landing functions. As illustrated in the particular example embodiment of FIG. 1, these conventional systems can include, for example, redundant pairs of global positioning systems (GPSs) 138, 140, inertial navigation systems (INSs) 142, 144, distance measuring equipment (DME) systems 146, 148, very high frequency omnidirectional radio range (VOR) systems 150, 152, and instrument landing systems (ILSs) 154, 156. As discussed above, one or more of these systems can be configured to evaluate the position and the attitude of the aircraft 110 relative to the runway 112 independently of the radar 116, and to use that evaluation to effect an all-weather, precision approach to and landing on the runway 112 under the appropriate conditions.

However, if the position and attitude of the aircraft 110 relative to the runway 112 as assessed independently by the radar 116 is also available as above, then the difference between the assessed and evaluated positions can be computed and used to control the aircraft 110 in accordance with the difference. That is, the above radar approach and landing system can be used as a "backstop" for the conventional approach and landing system of the aircraft 110, in which the former can be used to correct any errors in the latter's position and attitude determinations. For example, the contribution of each of the two independent systems to a determination of an "actual" position and attitude of the aircraft 110 relative to the runway 112 can be weighted in accordance with the confidence in the respective reliability and accuracy of the two systems, which might vary, for example, as a function of the distance between the aircraft 110 and the runway 112.

Figure 6:
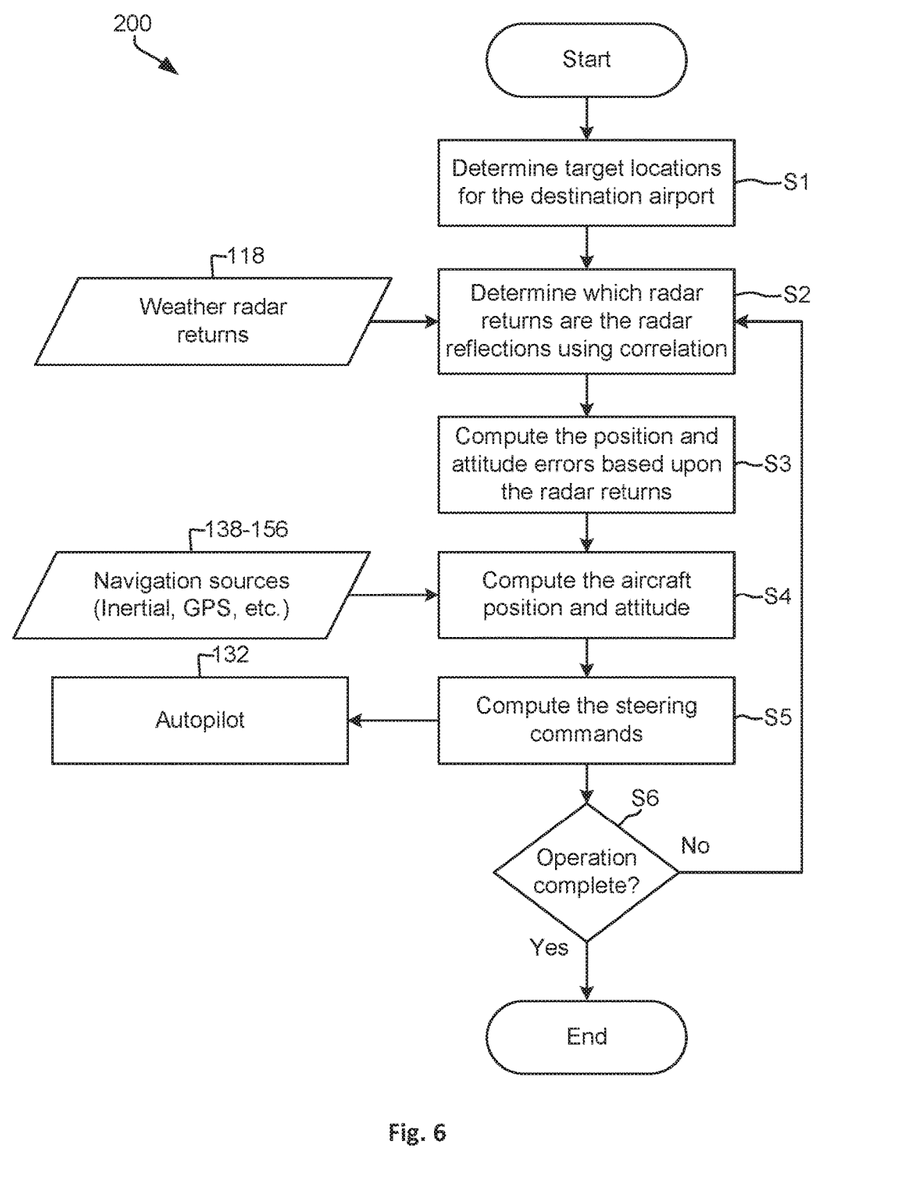
FIG. 6 is a process flow diagram of an example embodiment of a method for controlling an aircraft in accordance with the present disclosure.

FIG. 6 is a process flow diagram of an example embodiment of a method 200 for controlling the aircraft 110 in accordance with the present disclosure. As discussed above, the method 200 begins at S1 with storing data in the databases 106 and 108 of the aircraft 110. As above, the data include the respective positions, relative to each other and to the runway 112, of a plurality of radar targets 114 disposed within a region adjacent to the runway 112, as well as a desired attitude of the aircraft 110 relative to the runway 112.

At S2, the region adjacent to the runway 112 is then scanned with the radar 116 of the aircraft 110 to obtain radar data corresponding to the respective positions, relative to each other and to the aircraft 110, of a plurality of radar returns or reflections 118 from the region, including reflections from the radar targets 114. The radar data corresponding to the radar targets 114 is then distinguished from the radar data corresponding to the radar reflections 118 using the correlators 122 and 124 and the target correlation algorithm, and at S3, the position and attitude of the aircraft 110 relative to the runway 112 is then assessed by the navigation function computers 126 and 138 using the stored data and the radar data determined to correspond to the radar targets 114.

At S4, the position and the attitude of the aircraft 110 relative to the runway 112 is then evaluated in conjunction with the radar assessment using the navigation function computers 126 and 128 and data supplied by at least one of the conventional navigation systems 138-156, and at S5, the difference between the assessed position and attitude and the evaluated position and attitude are computed, and the difference is input to the autopilot 132 to effect control of the aircraft 110 at least in part in accordance with the difference.

At S6, a decision is made as to whether the process 200 has been completed. If "no," the process flow returns to S2 for a recursion of the steps S3-S5 described above, and if "yes," then the process is terminated.

As those of some skill in this art will by now appreciate, and depending on the specific application at hand, many modifications, substitutions and variations can be made in and to the materials, apparatus, configurations and methods of use of the aircraft all-weather, precision control systems of present disclosure without departing from its spirit and scope. In light of this, the scope of the present invention should not be seen as limited to those of the particular embodiments illustrated and described herein, as they are merely by way of some examples thereof, but rather, should be fully commensurate with that of the claims appended hereafter and their functional equivalents.

What is claimed is:

1. A method for controlling an aircraft, the method comprising:
   accessing data aboard the aircraft, the data including:
      respective positions, relative to each other and to a runway, of a plurality of radar targets disposed within a region adjacent to the runway; and
      a desired attitude of the aircraft relative to the runway;
   scanning the region with a radar disposed aboard the aircraft to obtain radar data corresponding to respective positions, relative to each other and to the aircraft, of a plurality of radar reflections from the region, including reflections from the radar targets;
   distinguishing the radar data corresponding to the radar targets from the radar data corresponding to the radar reflections;
   assessing a position and an attitude of the aircraft relative to the runway using the data and the radar data corresponding to the radar targets;
   evaluating the position and the attitude of the aircraft relative to the runway using a navigation system that is independent of the radar;
   computing a difference between the assessed position and the evaluated position; and
   computing a difference between the assessed attitude and the evaluated attitude.

2. The method of claim 1, wherein the radar comprises a weather radar.

3. The method of claim 1, wherein at least one of the radar targets comprises a dihedral or a trihedral radar reflector.

4. The method of claim 1 wherein the distinguishing comprises correlating the respective positions of the radar targets relative to each other, as obtained by the radar, with the respective positions of the radar targets relative to each other, as stored aboard the aircraft.

5. The method of claim 1, further comprising controlling the aircraft in accordance with at least one of the position difference and the attitude difference.

6. The method of claim 5, wherein the controlling comprises:
   adjusting a rectilinear movement of a center of gravity (CG) of the aircraft; and
   adjusting an angular movement of the aircraft about each of a pitch axis, a yaw axis and a roll axis of the aircraft.

7. The method of claim 5, wherein the controlling is effected by an autopilot disposed aboard the aircraft.

8. The method of claim 5, further comprising:
   displaying at least one of the assessed position and attitude and/or the evaluated position and attitude on a display disposed aboard the aircraft; and
   effecting the controlling manually using the display.

9. The method of claim 1, wherein the accessing further comprises:
   surveying the radar targets and the runway to obtain the data; and
   storing the data in a database of the aircraft.

10. The method of claim 1, further comprising at least one of:
    correcting the assessed position as a function of the position difference; and/or
    correcting the assessed attitude as a function of the attitude difference.

11. A system for controlling an aircraft, the system comprising:
    a database disposed aboard the aircraft and storing data corresponding to:
       respective positions, relative to each other and to a runway, of a plurality of radar targets disposed within a region adjacent to the runway; and
       a desired attitude of the aircraft relative to the runway;
    a radar disposed aboard the aircraft and configured to scan, detect and generate data corresponding to respective positions, relative to each other and to the aircraft, of a plurality of radar reflections from the region, including reflections from the radar targets;
    a correlator disposed aboard the aircraft and configured to distinguish the radar data corresponding to the radar targets from the radar data corresponding to the radar reflections; and
    a navigation system disposed aboard the aircraft and configured to:
       assess a position and an attitude of the aircraft relative to the runway using the stored data and the radar data corresponding to the radar targets;
       evaluate the position and the attitude of the aircraft relative to the runway independently of the radar and using at least one of a global positioning system (GPS), an inertial navigation system (INS), a distance measuring equipment (DME) system, a very high frequency omnidirectional radio range (VOR) system, and/or an instrument landing system (ILS);
       compute a difference between the assessed position and the evaluated position;
       compute a difference between the assessed attitude and the evaluated attitude; and
       control the aircraft in accordance with at least one of the position and attitude differences.

12. The system of claim 11, wherein the correlator comprises:
    a computer; and
    an algorithm comprising a non-transitory machine-readable medium comprising a plurality of machine-readable instructions which, when executed by one or more processors of the computer, are configured to cause the computer to:
       correlate the respective positions of the radar targets relative to each other, as obtained by the radar, with the respective positions of the radar targets relative to each other, as stored aboard the aircraft; and
       distinguish the radar data corresponding to the radar targets from the radar data corresponding to the radar reflections.

13. The system of claim 11, wherein the radar comprises a weather radar.

14. The system of claim 11, further comprising an autopilot configured to control the aircraft in accordance with the difference.

15. The system of claim 11, further comprising a display configured to generate and present to a pilot of the aircraft a visual presentation of at least one of:
    the assessed position of the aircraft;
    the evaluated position of the aircraft;
    the assessed attitude of the aircraft;
    the evaluated attitude of the aircraft;
    the position difference; and/or
    the attitude difference.

16. The system of claim 15, wherein the display comprises a heads up display (HUD).

17. The system of claim 11, wherein the navigation system comprises a plurality of identical or substantially similar navigation systems operating redundantly.

18. An apparatus for controlling an aircraft, the apparatus comprising:
  a radar disposed aboard the aircraft and configured to:
    scan a region surrounding a runway; and
    generate radar data corresponding to respective positions, relative to each other and the aircraft, of a plurality of radar reflections from the region, including reflections from radar targets;
  a correlator disposed aboard the aircraft and configured to:
    correlate the radar data with data located aboard the aircraft, the data comprising respective positions, relative to each other and the runway, of a plurality of radar targets disposed within the region relative to the runway, and a desired attitude of the aircraft relative to the runway; and
    distinguish the radar data corresponding to the radar targets from the radar data corresponding to the radar reflections;
  a navigation system disposed aboard the aircraft and configured to evaluate a position and an attitude of the aircraft relative to the runway independently of the radar; and
  a computer disposed aboard the aircraft and configured to:
    assess the position and the attitude of the aircraft relative to the runway using the radar data corresponding to the radar targets and the data located aboard the aircraft; and
    compute a difference between the assessed position and attitude of the aircraft and the evaluated position and attitude of the aircraft.

19. The apparatus of claim 18, further comprising a controller configured to control movement of the aircraft at least in part as a function of the difference.

20. The apparatus of claim 18, wherein the navigation system comprises at least one of a global positioning system (GPS), an inertial navigation system (INS), a distance measuring equipment (DME) system, a very high frequency omnidirectional radio range (VOR) system, and/or an instrument landing system (ILS).

* * * * *